May 17, 1955
G. T. LAMPTON
2,708,306
METHOD OF RIFLING METAL TUBES
Filed July 9, 1952
2 Sheets-Sheet 1
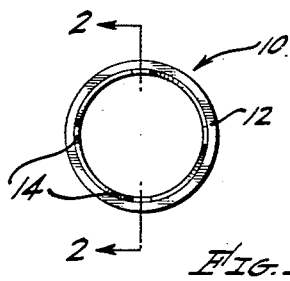
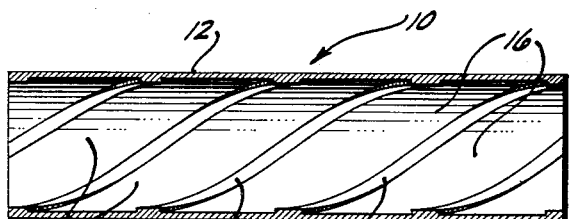
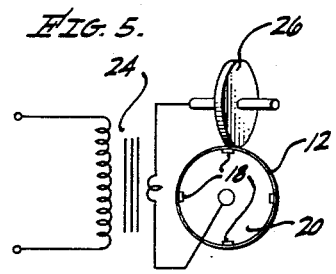
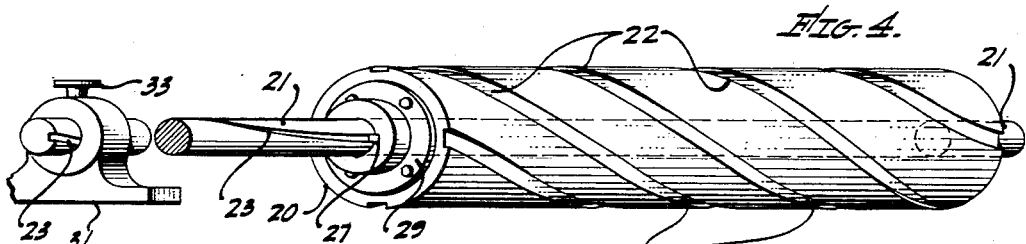
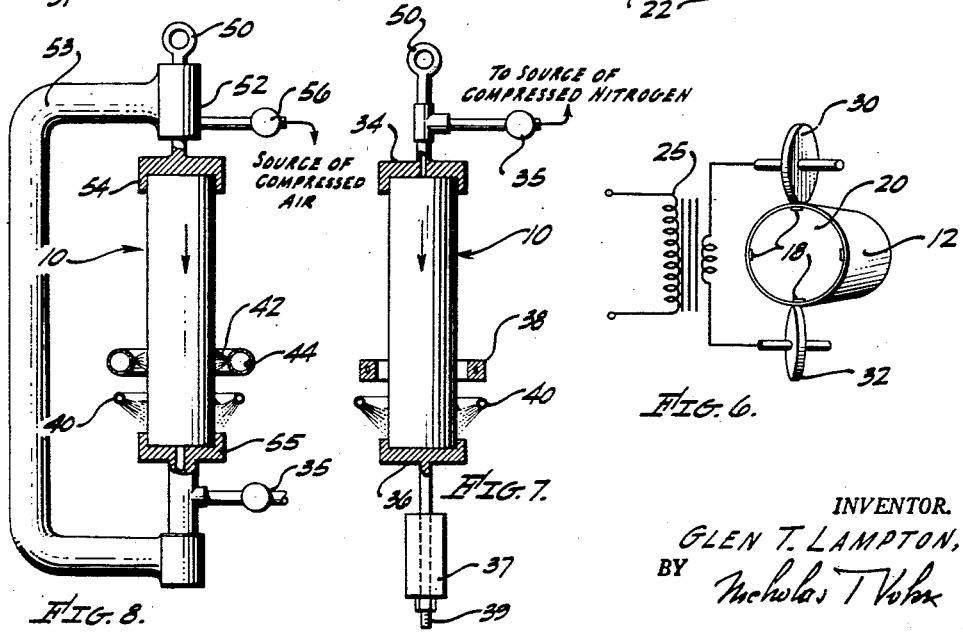
INVENTOR.
GLEN T. LAMPTON,
BY Nicholas T Volex
ATTORNEY.

May 17, 1955 G. T. LAMPTON 2,708,306
METHOD OF RIFLING METAL TUBES
Filed July 9, 1952 2 Sheets-Sheet 2
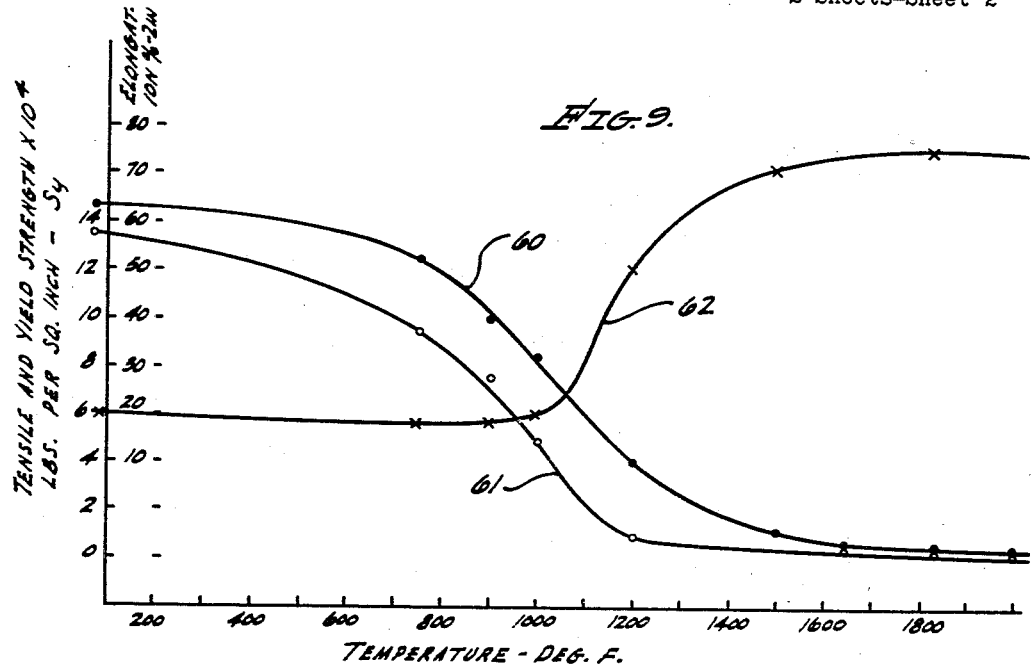
Fig. 9.
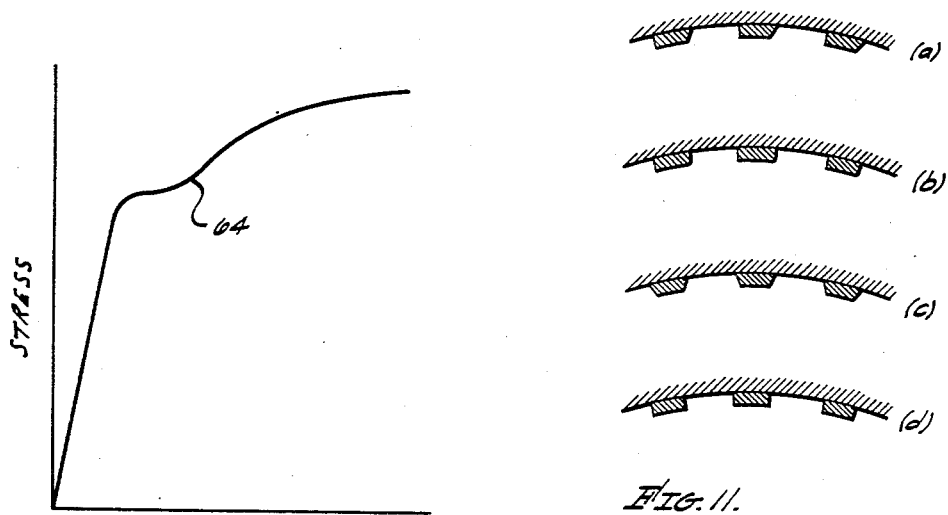
Fig. 10.
Fig. 11.
INVENTOR.
GLEN T. LAMPTON,
BY
ATTORNEY.

United States Patent Office 2,708,306
Patented May 17, 1955

2,708,306

METHOD OF RIFLING METAL TUBES

Glen T. Lampton, Santa Monica, Calif., assignor to Hughes Tool Company, Houston, Tex., a corporation of Delaware Application July 9, 1952, Serial No. 297,827

6 Claims. (Cl. 29—421)

This invention relates to rifled tubing and methods for producing such tubing, and more particularly to a thin-walled rifled metal tubing and methods for producing such tubing.

The customary procedure for rifling a bore is to cut a system of helical grooves in the surface of the bore, leaving intervening lands between the grooves. This procedure requires machining operations that are particularly time-consuming where the wall surrounding the bore is extremely thin, and especially where the material of the wall is steel or an alloy thereof.

To eliminate the time-consuming machining operations, another procedure has been used by which the bore of a tube is rifled at the same time the tube is made. In this procedure, metal is extruded through a die, and the lands and grooves are formed in the bore of the tube at the same time the wall is being formed. Materials adaptable for extrusion have limited wear resisting qualities, particularly when subjected to the type of wear associated with a rifled bore.

The present invention is fundamentally different from the above methods, since the lands are formed by welding an appropriate number of wire or metallic ribbon members to the inner surface of a cylindrical tube, and the grooves are formed by the spaced relationship of the wire members with respect to each other and the helical relationship of the wires with respect to the axis of the tube. This invention makes possible the rifling of thin-walled metal tubes without removing metal to form the grooves, and it further permits the use of heat resisting material having high tensile strength and long wearing qualities in the production of rifled tubes which are truly cylindrical and symmetrical with respect to the longitudinal axis of the cylinder.

It is, therefore, an object of the invention to provide a method of rifling metal tubes which eliminates the necessity of machining rifling grooves in the bore of the tube.

It is also an object of this invention to provide a novel rifled thin-walled tube in which helically shaped ribbons are welded to the inner surface of the tube, the welded ribbons constituting the rifling means within this tube.

It is another object of the invention to provide a method of rifling metal tubes whereby the lands of the rifling are added to the bore of the tube without removing material from the wall of the tube.

It is a further object of the invention to provide a method of rifling metal tubes whereby the rifling lands are separately formed and added to the bore of the tube.

It is an additional object to provide a method of rifling metal tubes whereby a plurality of helical members are welded to the inner surface of the tube in spaced relation to form rifling in the bore of the tube.

It is also an object of this invention to provide a method of rifling a metal tube whereby the lands are welded to the inner surface of the tube in spaced relationship with each other and in helical relationship with the axis of the tube.

It is a further object to provide such a method whereby the rifled metal tube is heated and worked for rounding and straightening the tube after welding.

It is also a further object to provide such a method whereby the rifled metal tube is progressively heated and quenched while its inner wall is subjected to gas pressure for straightening and rounding the welded tube.

The novel features which are believed to be characteristic of the invention, together with further objects and advantages thereof, will be better understood from the following description considered in connection with the accompanying drawings. It is expressly understood, however, that the drawings are for the purpose of illustration and description only, and are not intended to define the limits of the invention.

Fig. 1 is an end view of a rifled tube manufactured according to the invention;

Fig. 2 is a sectional view taken on line 2—2 of Fig. 1 illustrating the grooves and lands in the bore of the tube;

Fig. 3 is an elevational view of a preformed land used in manufacturing rifled tubes;

Fig. 4 is a perspective view illustrating the preformed lands arranged in helical grooves on an arbor;

Fig. 5 is a schematic illustration of an apparatus suitable for welding the lands to the tube;

Fig. 6 is a schematic illustration of another apparatus suitable for welding lands to the tube;

Fig. 7 is a schematic illustration of an apparatus suitable for straightening and rounding the tube after welding;

Fig. 8 is a schematic illustration of another apparatus suitable for straightening and rounding the tube after welding;

Fig. 9 is a chart showing the effect of temperature on the physical properties of metal;

Fig. 10 is a stress-strain diagram; and

Fig. 11 is a schematic illustration of various rifling profiles.

Referring to Figs. 1 and 2, the rifled tube 10 comprises a round, thin-walled metal tube 12 having a straight longitudinal axis, and a system of alternate spiral lands 14 and grooves 16 formed by welding helical members 18 in diametrically opposite positions to the inner surface of the tube. Helical members 18 operate as lands 14, and the spaces between them operate as grooves 16, the two constituting the rifling in the bore of the tube.

Tube 12 is made of seamless or welded tubing cut to desired length and then cleaned and otherwise prepared for welding. Wire stock for use in making the helical members 18 is also prepared for welding and may be preformed as shown in Fig. 3, in which case the preparation for welding takes place after the forming step.

When members 18 are preformed as shown in Fig. 3, their shapes are such as to be readily formed by standard machines commonly used in forming helical springs; since machines of this type are known in the art, the mechanics of preforming the wire has been omitted from the drawings.

In practicing the methods of this invention, an arbor 20, constructed of material such as copper or a copper alloy having adequate electrical current conducting properties, is provided with helical grooves 22 dimensioned to form a sliding fit with the wire and having a depth smaller than the thickness of the ribbons or the diameter of the wire so that the wires slightly protrude from the arbor. As illustrated in Fig. 4, grooves 22 are spaced 90° apart and form true and uniform helices with respect to the axis of the arbor and parallel with respect to each other. Since arbor 20 has a diameter slightly smaller than the bore of tube 12 and the wires protrude slightly from the arbor grooves, the wires form a sliding fit with the tube.

Lengths of wire cut from stock prepared for welding are placed in each of the grooves 22 of arbor 20, whereupon, metal tube 12 is telescoped over the arbor and the wires. In this manner, the wires become helical members 18 engaging the inner surface of the tube and in helical relationship with respect to the axis of the tube. In this condition, the helical members and the tube are ready for welding, which is described below.

Fig. 5 illustrates schematically a seam welding apparatus which includes a welding transformer 24 having one leg of its secondary winding connected to a roller electrode 26 and the other leg connected to arbor 20 which operates as the other electrode. Mechanical pressure and welding current are applied to tube 12 and helical member 18 by means of roller electrode 26 and arbor electrode 20 while arbor 20 with its assembled tube and helical members are spirally moved under roller electrode 26. Welding current is caused to flow between electrode 26, tube 12, helical member 18, and arbor 20 while the assembly is spirally moved under roller 26 for continuously welding the helical member 18 to the inner surface of tube 12 throughout the length of mutual contact. This step is repeated until all of the members 18 are welded to the inner surface of tube 12. The spiral movement of the assembly may be obtained by means of a guide bar 21 having a spiral keyway 23, which is engaged by a key 27 securely fixed in a hub 29 attached to the end of arbor 20. Guide bar 21 extending through a bore in arbor 20 is supported on each end by a support member such as member 31, which includes a hand screw 33 for clamping bar 21 against rotation. When arbor 20 is moved longitudinally along bar 21, rotation is imparted to the arbor by key 27 as it follows spiral keyway 23.

A modification of the apparatus shown in Fig. 5 is illustrated in Fig. 6 in which the welding transformer 25 has one leg of its secondary winding connected to a roller electrode 30 and the other leg connected to a second roller electrode 32. In this apparatus the arbor, the helical members, and the tube assembly is spirally moved between roller electrodes 30 and 32, in which case, the welding current flows from electrode 30, through one side of tube 12, one helical member 18, arbor 20, a second helical member 18 diametrically opposite the first member, and the opposite side of tube 12 to the lower electrode 32; and vice versa. Thus, with the apparatus of Fig. 6, two helical members 18 are welded in diametrically opposite positions to the inner surface of tube 12 simultaneously throughout the length of contact between the members and the tube. The completely welded tube 10 is removed by unscrewing the tube from arbor 20.

Once the tube is removed from the arbor, its subsequent use may require a degree of straightness and roundness which may require further processing of the tube because of warpage which may result from the welding operations. Straightening and rounding welded tube 10 is accomplished by known principles of working the metal of the tube beyond its elastic limit or yield point in apparatus illustrated in Figs. 7 and 8.

The chart in Fig. 9 illustrates the effect of elevated temperatures on the physical properties of metal generally and particularly of a steel alloy having a composition designated by the number SAE4340. For a given temperature within the range shown, the tensile strength and the yield strength of the alloy is readily determined from curves 60 and 61, respectively; while the elongation can be determined with the aid of curve 62. This change in physical properties under the influence of heat is used to lower the forces required to work the metal in tube 10 beyond its yield point during the straightening and rounding process.

In Fig. 7, rifled tube 10 is sealed at each end by suitable grips 34 and 36, and charged with a compressed inert gas such as nitrogen. Under this condition tube 10 is subjected to an internal unit pressure $p$ which simultaneously produces hoop tension and longitudinal tension in the tube wall. The unit stress $S$ of the metal under hoop tension is equal to $pr/t$ where $p$ is the internal unit pressure, $r$ is the internal radius of tube 10, and $t$ is the tube wall thickness; whereas, the unit stress $S'$ of the metal under longitudinal tension is equal to ½ of $pr/t$ or $S/2$ (see Marks' Handbook, fifth edition, Combined Stresses in Thin Cylinders).

By selecting a temperature from the chart in Fig. 9, and determining the corresponding yield strength $Sy$ with the aid of curve 61, the corresponding internal unit pressure $p$ can be found by substituting $Sy$ for $S$ in the above equation, or $p$ equals $Syt/r$. When tube 10 or an annular section thereof is uniformly subjected to the above conditions of temperature, and to an internal unit pressure $p_1$ slightly exceeding $p$, the wall of the tube will stretch as indicated by elongation curve 62, Fig. 9.

The stress-strain curve 64 in Fig. 10 illustrates the fact that stretching the metal in the tube will increase its yield strength above $Sy$ to a new value $Sy_1$, and as indicated by curve 62, Fig. 9, stretching the metal will also decrease the value of $t$ to a new value $t_1$; therefore, $r$ will have a new value $r_1$. Thus, when $p_1r_1/t_1$ equals $Sy_1$, the stretching stops, since the new strength of the metal equals the new forces acting against it.

If tube 10 is round, the value of $r$ is uniform for the whole inner circumference of the tube. Since $p_1$ is constant, the value of $p_1r$ increases uniformly to $p_1r_1$ by the stretch of the metal in the tube. If tube 10 is not round, the value of $r$ varies; therefore, the value of $p_1r$ varies. As the metal in the tube stretches under the influence of $p_1$ the wall of the tube is radially adjusted by the unbalanced forces resulting from the different values of $r$ until $p_1r_1/t_1$ equals $Sy_1$, which equals the condition of a round tube.

Rifled tube 10, Fig. 7, is heated to the temperature selected by passing the tube through a work coil 38 coupled to a high frequency generator, not shown. The heating effect of coil 38 is confined to a narrow annular band around tube 10; therefore, as the tube passes through coil 38, the coil progressively heats axially adjacent portions of the tube. Subsequent quenching of the heated portions is provided by a circular pipe 40 spaced below coil 38 and arranged to spray a coolant against the tube from a source not shown.

A pressure regulator 35 maintains the internal unit pressure of the gas within tube 10 at the value required for the temperature and yield strength selected.

Since the internal unit pressure $p_1$ is maintained at the proper level for the yield strength $Sy$ of the metal in the tube under hoop tension, and since the longitudinal tension is one-half the value of the hoop tension, it follows that, in order to stretch the metal in the tube longitudinally, and thereby straighten the tube axially, an additional force is necessary for increasing the longitudinal tension above that produced by the internal unit pressure $p_1$. For this purpose, a weight 37 is attached to plug 36 by a rod 39 in Fig. 7. Tube 10 is lowered through coil 38 and circular pipe 40 by means of ring 50 and conventional hoisting equipment.

In Fig. 8, tube 10 is heated by gas flames 42 directed against all sides of the tube to provide a hot-working zone. The flames are fed from a header 44 which is connected to a source of combustible gas not shown. A circular pipe 49 positioned below header 44 supplies the coolant necessary for the quenching zone in the manner as described in connection with Fig. 7.

The rounding of tube 10 is accomplished in Fig. 8 in the same manner as described for tube 10 in Fig. 7. However, in Fig. 8, the additional force necessary for increasing the longitudinal tension above that produced by the internal unit pressue $p_1$ is provided by an air-operated piston and cylinder unit 52 fixed to one end of a frame 53. A grip 54 attached to the piston of unit 52 grips and seals the upper end of rifled tube 10; while a similar grip 55, fixed to the other end of frame 53, grips and seals the lower end of tube 10.

Compressed air controlled by a pressure regulator 56 urges the piston of unit 52 upward thereby supplying the additional force necessary to increase the longitudinal tension in the metal of tube 10.

For the sake of clarity, Figs. 1 and 2 illustrate rifled tube 10 with four lands; however, the number of lands may be increased or decreased as the requirements demand. By selecting wire of different cross section, different rifling profiles can be produced as shown by the illustrations in Fig. 11, of which profile (a) includes lands having one side radial and the other side sloping; in profile (b) the lands have one sloping side and one rounded side; in profile (c) the lands are provided with both sides sloping; and in profile (d) the lands are provided with parallel sides.

An important feature of this invention resides in the fact that rifled tubes of wear-resisting metal, having extremely thin walls can be produced on a quantity production basis because the time-consuming machining operations are eliminated. Furthermore, rifling profiles, which are difficult to provide by machining operations, can be produced easily by the method herein described. Where steel alloys are used in the construction of rifled tubes, this invention permits the use of one alloy in the tube and a different alloy in the lands.

The apparatus for performing the steps of this invention are shown schematically, and are not intended to illustrate the structural limitations thereof. It is obvious that modifications and alterations in the apparatus will occur to one skilled in the art, and it is understood that such changes can be made within the scope of the appended claims.

What is claimed as new is:

1. In the production of a rifled thin-walled metal tube, the method of removing distortion from the rifled tube by progressively heating axially adjacent circumferential portions of the wall of said tube while subjecting said portions to hoop tension and longitudinal tension simultaneously.

2. The method of rifling a thin-walled metal tube including the steps of welding wire members of uniform cross section to the inner surface of the tube in helical relationship with respect to the axis of said tube, and removing distortion from the welded tube by applying heat progressively to axially adjacent circumferential portions of the wall of said welded tube and subjecting said heated portions to hoop tension and longitudinal tension simultaneously.

3. The method of rifling a thin-walled metal tube including the steps of welding longitudinal members of uniform cross section to the inner surface of the tube in helical relationship with respect to the axis of said tube; then rounding and straightening the welded tube by progressively heating axially adjacent circumferential portions of said welded tube, and simultaneously subjecting said heated portions to hoop tension and longitudinal tension of sufficient magnitudes to cause said portions to stretch circumferentially and longitudinally.

4. The method defined in claim 3 which further includes the step of progressively quenching the stretched hot portions of the tube wall.

5. In the production of a rifled thin-walled metal tube having lands welded to the inner surface of the tube, the method of removing distortion from the rifled tube including the steps of closing both ends of said tube, progressively heating axially adjacent circumferential portions of the wall of the closed tube, and subjecting the heated wall portions simultaneously to hoop tension and longitudinal tension by applying compressed gas internally of the closed tube and by applying an external tensional force axially to said tube through the closed ends thereof, said hoop tension and said longitudinal tension being of sufficient magnitudes to cause said heated wall portions to stretch circumferentially and longitudinally.

6. The method defined in claim 5 which further includes the step of progressively quenching the stretched hot portions of the tube wall.

References Cited in the file of this patent

UNITED STATES PATENTS

| | | |
|---|---|---|
| 1,320,430 | Wheeler | Nov. 4, 1919 |
| 1,628,804 | Price | May 17, 1927 |
| 1,909,704 | Morseth | May 16, 1933 |
| 2,210,353 | Barnes | Aug. 6, 1940 |
| 2,449,944 | Johnson | Sept. 21, 1948 |
| 2,483,454 | Brown | Oct. 4, 1949 |
| 2,609,595 | Rossheim | Sept. 9, 1952 |